United States Patent
Schreier et al.

(10) Patent No.: US 7,462,284 B2
(45) Date of Patent: Dec. 9, 2008

(54) DISSIMILATORY SULFATE REDUCTION AS A PROCESS TO PROMOTE DENITRIFICATION IN MARINE RECIRCULATING AQUACULTURE SYSTEMS

(75) Inventors: Harold J. Schreier, Baltimore, MD (US); Yossi Tal, Baltimore, MD (US)

(73) Assignee: University of Maryland Biotechnology Institute, Baltimore, MD (US)

( * ) Notice: Subject to any disclaimer, the term of this patent is extended or adjusted under 35 U.S.C. 154(b) by 66 days.

(21) Appl. No.: 10/588,256

(22) PCT Filed: Jan. 31, 2005

(86) PCT No.: PCT/US2005/002745

§ 371 (c)(1),
(2), (4) Date: Nov. 22, 2006

(87) PCT Pub. No.: WO2005/075366

PCT Pub. Date: Aug. 18, 2005

(65) Prior Publication Data

US 2007/0163952 A1    Jul. 19, 2007

Related U.S. Application Data

(60) Provisional application No. 60/540,566, filed on Jan. 30, 2004.

(51) Int. Cl.
 A01K 63/04    (2006.01)
 C02F 3/30    (2006.01)

(52) U.S. Cl. ............... 210/605; 210/617; 210/903; 210/167.22; 119/227; 119/260

(58) Field of Classification Search ............... 210/605, 210/611, 612, 615, 616, 617, 618, 903, 167.22, 210/167.26; 119/227, 260
See application file for complete search history.

(56) References Cited

U.S. PATENT DOCUMENTS 5,078,884 A    1/1992    Mulder (Continued)

FOREIGN PATENT DOCUMENTS

JP    2002-159992 A    6/2002

(Continued)

OTHER PUBLICATIONS

Daims, H., et al., Novel Nitrospira-like bacteria as dominant nitrite-oxidizers in biofilms from wastewater treatment plants: diversity . . . , Water Science and Technology, 2000, pp. 85-90, vol. 41, No. 4-5.

(Continued)

Primary Examiner—Fred Prince
(74) Attorney, Agent, or Firm—Steven J. Hultquist; Intellectual Property/Technology Law; Kelly Reynolds

(57) ABSTRACT

The present invention relates to a novel approach for nitrate removal from a marine recirculating system (10) wherein high concentrations of sulfate found in seawater is used in combination with sludge (20) collected from fish growing tanks (12) to promote dissimilatory sulfate reduction to hydrogen sulfide. The sulfide is used as an electron source to promote autotrophic denitrification in an up-flow fix bed bioreactor (16), followed by nitrification in a nitrification unit (14). By utilizing the symbiotic relationship between the sulfate-reducing and sulfide-oxidizing bacterial community, nitrate accumulation is controlled in the recirculating water of the system thereby reducing water exchange in the marine recirculating system.

20 Claims, 3 Drawing Sheets

U.S. PATENT DOCUMENTS

| | | | | |
|---|---|---|---|---|
| 5,232,586 A * | 8/1993 | Malone | ............... | 210/151 |
| 5,482,630 A | 1/1996 | Lee et al. | | |
| 5,660,142 A * | 8/1997 | Van Rijn | ............... | 119/227 |
| 6,616,844 B2 | 9/2003 | Park et al. | | |
| 7,025,883 B1 * | 4/2006 | Olivier | ............... | 210/602 |

FOREIGN PATENT DOCUMENTS

| | | |
|---|---|---|
| WO | WO - 98/07664 A1 | 2/1998 |
| WO | WO - 03/065798 A1 | 8/2003 |

OTHER PUBLICATIONS

Hovanec, T.A., et al., Comparative analysis of nitrifying bacteria associated with freshwater and marine aquaria, Appl. Environ. Microbiol., Aug. 1996, pp. 2888-2896, vol. 62, No. 8.

Kloep, Frank, et al., Performance and microbial structure of a nitrifying fluidized-bed reactor, Wat. Res., Jan. 1, 2000, pp. 311-319, vol. 34, No. 1.

Megonigal, J.P., et al., Anaerobic metabolism: Linkages to trace gases and aerobic processes, Biochemistry (W.H. Schlesinger, Ed), 2004, pp. 359-361, Publisher: Elsevier-Pergamon, Published in: Oxford, UK.

O'Donnell, Anthony G., et al., 16S rDNA methods in soil microbiology, Current Opin. Biotech., Jun. 1999, pp. 225-229, vol. 10, No. 3.

Princic, Alenka, et al., Effects of pH and Oxygen and Ammonium Concentrations on the Community Structure of Nitrifying Bacteria from Wastewater, Appl. Environ. Microbiol., Oct. 1998, pp. 3584-3590, vol. 64, No. 10.

Rusten, Bjørn, et al., Moving bed biofilm reactors and chemical precipitation for high efficiency treatment of wastewater from small . . . , Water Sci. Tech., 1997, pp. 71-79, vol. 35, No. 6.

Rusten, B., et al., Pilot testing and preliminary design of moving bed biofilm reactors for nitrogen removal at the FREVAR wastewater . . . , Water Sci. Tech., 2000, pp. 13-20, vol. 41, No. 4-5.

Strous, Marc, et al., Missing lithotroph identified as a new planctomycete, Nature, Jul. 29, 1999, pp. 446-449, vol. 400, No. 6743.

Tal, Yossi, et al., Characterization of the microbial community and nitrogen transformation processes associated with moving bed . . . , Aquaculture, Jan. 10, 2003, pp. 187-202, vol. 215, No. 1-4.

Tal, Yossi, et al., Anaerobic Ammonium-Oxidizing (Anammox) Bacteria and Associated Activity in Fixed-Film Biofilters of a Marine . . . , Appl. Environ. Microbiol., Apr. 2006, pp. 2896-2904, vol. 72, No. 4.

Van Rijn, Jaap, The potential for integrated biological treatment systems in recirculating fish culture—A review, Aquaculture, Jan. 15, 1996, pp. 181-201, vol. 139, No. 3-4.

* cited by examiner

DISSIMILATORY SULFATE REDUCTION AS A PROCESS TO PROMOTE DENITRIFICATION IN MARINE RECIRCULATING AQUACULTURE SYSTEMS

CROSS-REFERENCE TO RELATED APPLICATIONS

This application is filed under the provisions of 35 U.S.C. §371 and claims the priority of International Patent Application No. PCT/US2005/002745 filed 31 Jan. 2005 in the name of Harold J. Schreier and Yossi Tal for "DISSIMILATORY SULFATE REDUCTION AS A PROCESS TO PROMOTE DENITRIFICATION IN MARINE RECIRCULATING AQUACULTURE SYSTEMS," which claims the benefit of priority under 35 USC §119(e) of U.S. Provisional Patent Application No. 60/540,566 filed 30 Jan. 2004. The disclosures of said International Patent Application PCT/US2005/002745 and said U.S. Provisional Patent Application No. 60/540,566 are hereby incorporated herein by reference, in their respective entireties, for all purposes.

BACKGROUND OF THE INVENTION

1. Field of the Invention

The present invention relates to removing contaminants from an aquaculture system, and more particularly, to a recirculating marine aquaculture system and methods for using same for promoting denitrification through the process of dissimilatory sulfate reduction.

2. Description of the Related Art

The development of technology that enables the aquaculture industry to expand production of an aquatic species in urban recirculating systems requires systematic examination of each aspect of said aquatic systems. Optimal growth of the aquatic species is directly related to the environmental parameters, and as such, pollutants and waste by-products must be removed from the system to assure the species viability. Nitrogenous wastes are eliminated through the action of nitrifying and denitrifying biofilter units that rely on oxygen and reduced organic compounds, respectively, for their activity. Organic wastes are typically removed mechanically to avoid their consumption by bacteria, which uses oxygen and results in the buildup of toxic ammonia and noxious gases, such as hydrogen sulfide.

In most closed and quasi-closed aquaculture systems, ammonia is oxidized to nitrite $NO_2^-$ in an aerobic biofilter by autotrophic bacteria. Nitrite is more toxic then the ammonium ion, so a second bacterium is required to oxidize the nitrite to nitrate. While nitrate is considerably less toxic than ammonium or nitrite, it can also be a problem. Nitrate is typically removed from recirculating culture systems by water exchange. However, water exchange has several drawbacks. First, water removal in aquaculture systems normally involves a slow exchange with a thorough mixing of old and new water to avoid stressing the cultured aquatic species. Second, in systems where natural sea water is unavailable, deionized water and sea salts must be mixed, which may incur heavy additional costs. Finally, the high nitrate effluent must be normally discharged. However, the discharge of the high nitrate effluent is potentially a problem, since salt water cannot typically be discharged into a sewage system or a fluvial system. Further, there is a growing environmental concern about the discharge of nitrogenous waste. Discharge permits may be complex and often require very stringent pollutant limits. Thus, attempts have been made to denitrify the discharge.

Most recirculating systems generally utilize filtration systems that rely solely on the initial stage of nitrogen waste removal, i.e. nitrification, which eliminates ammonia but results in nitrate accumulation. However, relatively few studies have been conducted on nitrate removal from recirculating systems by biological denitrification. Otte and Rosenthal (1979) used an activated sludge tank fed from the bottom with pond water and stirred with a propeller to induce denitrification using glucose and methanol as carbon and energy sources. Kaiser et al. (1989) described a similar system in a recirculating trout culture unit using hydrolyzed cornstarch as a carbon source. Van Rijn (1996) offered a novel approach for applying the denitrification process in recirculating systems without any additional support of external carbon source. By using the sludge from the fish culture as a carbon source to support the denitrification process, he demonstrated the possibility of operating a "zero discharge" system. More recent studies used methanol as a carbon source with an automated dosing system to control nitrate concentrations in the fish tanks (Lee et al., 2000).

In order to achieve anaerobic conditions that would stimulate denitrification, many filtration systems require the addition of organic compounds to promote oxygen consumption during degradation by heterotrophic bacteria (and induce anaerobic pockets), as well as to serve as electron donors to support biological nitrate reduction in denitrifying biofilters. Additionally, alcohols, volatile fatty acids and sugars, which are often used as carbon sources for such systems, often lead to bacterial blooms, toxic by-products, among other problems, and result in elevated system costs. Thus, the disadvantages of stimulating denitrifying activity by heterotrophic bacteria far often outweigh the advantages.

Accordingly, it would be advantageous to develop a system and method that uses denitrification as a viable means of nitrate removal, however, uses an alternative electron donor source that reduces or eliminates the need for external organic source material and minimizes sludge production.

SUMMARY OF THE INVENTION

The present invention relates to a novel approach for nitrate removal from a marine recirculating system wherein sulfate, at the concentration found in seawater, (generally 1 kg of saltwater includes 10 to 11% sulfates) is used in combination with sludge collected from fish growing tanks to promote dissimilatory sulfate reduction to hydrogen sulfide. The sulfide is used as an electron source to promote autotrophic denitrification in an up-flow fixed bed bioreactor. By utilizing the symbiotic relationship between the sulfate-reducing and sulfide-oxidizing bacterial community, nitrate accumulation is controlled in the recirculating water of the system thereby reducing water exchange therein.

In one aspect the present invention relates to a recirculating aquaculture system that comprises a denitrification unit in combination with a sludge tank and a nitrification unit, wherein the denitrification unit removes nitrates from the aquaculture system by coupling dissimilatory sulfate reduction to denitrification.

In another aspect the present invention relates to a marine recirculating aquaculture system, the system comprising:
- at least one aquatic species rearing tank, wherein the rearing tank comprises a salt water medium;
- a sludge holding tank positioned downstream from the rearing tank and in fluid communication therewith, wherein the sludge holding tank comprises a media substrate for growth of microorganisms active in sulfate reduction;

a denitrification unit positioned downstream from the sludge tank and rearing tank and in fluid communication therewith, wherein the denitrification unit comprises a media substrate for growth of anaerobic microorganisms active in sulfide oxidization and nitrate reduction; and a nitrifying moving bed bioreactor positioned downstream from the denitrification unit and upstream of the rearing tank and in fluid communication therewith, wherein the nitrifying moving bed bioreactor comprises a media substrate for growth of microorganisms active in nitrification.

Preferably the marine recirculating aquaculture system further comprises a drum screen filter positioned between the rearing tank and the sludge tank, wherein the drum screen filter separates solids from the recirculating salt water medium with subsequent transference of such separated solids to the sludge tank. The system further comprises a conduit system connecting the different components thereby providing for directing the saltwater medium through the different components of the system and if desired bypassing some components such as the sludge holding tank.

In yet another aspect, the present invention relates to a marine recirculating aquaculture system for removing nitrates therefrom, the system comprising:

at least one aquatic species rearing tank, wherein the rearing tank comprises a salt water medium;

a sludge holding tank positioned downstream from the rearing tank and in fluid communication therewith, wherein the sludge holding tank comprises a media substrate for growth of microorganisms active in sulfate reduction;

a drum screen filter positioned between the rearing tank and the sludge tank and in fluid communication therewith, wherein the drum screen filter separates solids transferred from the tank in the recirculating salt water medium with subsequent transference of such separated solids to the sludge tank;

a denitrification unit positioned downstream from the sludge tank and rearing tank and in fluid communication therewith, wherein the denitrification unit comprises a fixed bed of media substrate for growth of anaerobic microorganisms active in sulfide oxidization and nitrate reduction; and a nitrifying moving bed bioreactor positioned downstream from the denitrification unit and upstream of the rearing tank and in fluid communication therewith, wherein the nitrifying moving bed bioreactor comprises an inlet and outlet for movement of the salt water medium therethrough;

a suspended media substrate for growth of aerobic microorganisms active in nitrification, wherein the suspended media is kept in motion by the movement of the salt water medium; and aeration means to inject air or oxygen into the salt water medium for effective aerobic nitrification by the microorganisms.

In a still further aspect, the present invention relates to a method for reducing and/or removing nitrogenous products from a marine recirculating aquaculture system, the method comprising:

housing an aquatic species in a rearing tank containing salt water medium, wherein the salt water medium comprises sulfates and is contaminated with at least ammonia and nitrates;

transferring the salt water medium from the rearing tank through a downstream filtering means for separating solid materials from the salt water medium;

transferring separated solids and at least some of the salt water medium to a sludge holding tank, wherein the sludge holding tank comprises a media substrate for growth of microorganisms active in sulfate reduction;

retaining the separated sludge and salt water medium in the sludge holding tank a sufficient time for generating sulfides through metabolic reduction of sulfate in the salt water medium by microorganisms active in sulfate reduction;

transferring the salt water medium comprising the sulfides from the sludge holding tank to a denitrification unit positioned downstream from the sludge tank, wherein the denitrification unit comprises a fixed bed of media substrate for growth of anaerobic microorganisms active in sulfide oxidization and nitrate reduction;

retaining the salt water medium in the denitrification unit for a sufficient time for oxidizing sulfides to sulfates and reducing nitrates to nitrogen gas by the microorganisms active in sulfide oxidization and nitrate reduction;

transferring the salt water medium from the denitrification unit to a nitrifying moving bed bioreactor (MBB) positioned downstream from the denitrification unit, wherein the MBB comprises moving suspended media substrate for growth of aerobic microorganisms active in nitrification;

retaining the salt water medium in the MBB for a sufficient time to reduce ammonia concentration in the salt water medium; and transferring the salt water medium from the MBB to the rearing tank.

Other features and advantages of the invention will be apparent from the following detailed description, drawings and claims.

DETAILED DESCRIPTION OF THE INVENTION

The present invention provides for denitrification to be driven by the redox gradient between system compartments resulting in sulfate reduction (sulfide production), which in turn, is used for nitrate reduction. Thus, denitrification uses the reducing capacity derived from organic waste degradation in a marine recirculating aquaculture system by relying on coupling dissimilatory sulfate reduction to denitrification as shown in the following equation:

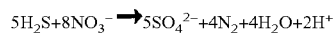

Advantageously, the present invention effectively manages wastes in the recirculating marine aquaculture systems described herein by efficiently limiting the amount of water exchange necessary to maintain a high degree of water quality therein.

Figure 1:
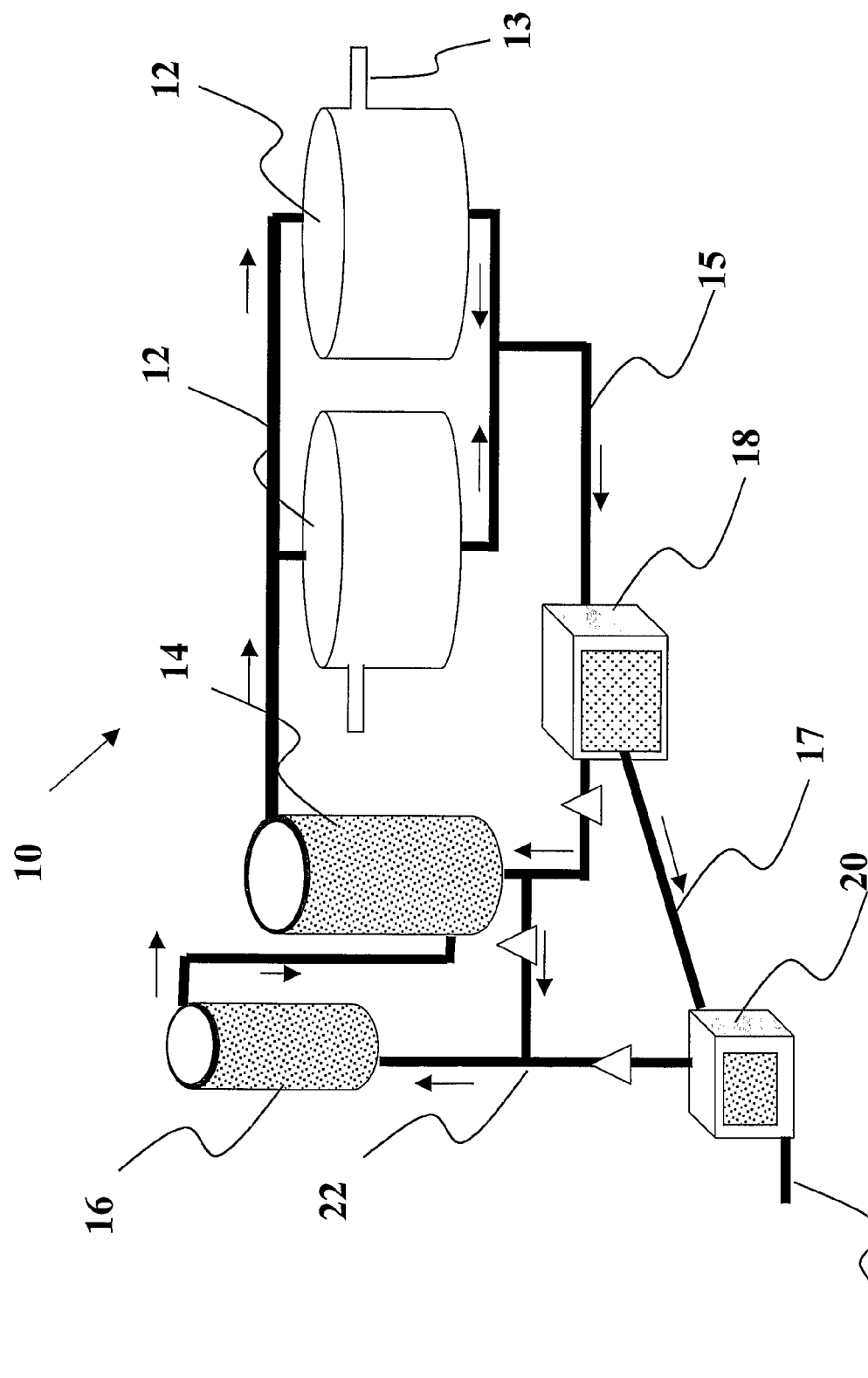
FIG. 1 shows a marine recirculating aquaculture system of the present invention.

Referring to FIG. 1, there is shown a marine recirculating aquaculture system 10 of the present invention comprising aquatic species rearing tanks 12 for holding a saltwater medium or any other aqueous solutions containing a sufficient amount of sulfates to mimic the levels found in saltwater suitable for a primary cultured aquatic species. Associated with the rearing tanks are various components, conduits and the like. While there may be other locations for the nitrifying moving bed bioreactor 14 and anaerobic fixed biofilter denitrification unit 16, those locations will be specified hereinafter with a discussion of the particular components. The schematic illustration of FIG. 1 includes arrowheads indicating the general direction of the flow of effluent through the system, understanding that the flow may be reversed and specific components moved to be positioned in alternative positions known to be effective by one skilled in the art. Pumps are not shown, but one skilled in the art can readily determine where pumps should be placed, the specific type of pumps and the direction in which the pump would move the fluid, particularly in view of the directional arrows and in view of the context of this direction.

As shown in FIG. 1, the rearing tanks 12 may be any configuration and fabricated from any appropriate material that is compatible with the aquatic species reared therein. The rearing tank farther comprises a nutrient supply means 13 for introducing food, vitamins, minerals or other nutrients to the aquatic species. Additional components of the present system include a sludge collection system that includes a microscreen drum filter 18 with a backwash system for periodic cleaning and flushing of the filter. Sludge and backwash fluid are removed from the drum filter 18 and collected in sludge tank 20. A valved conduit 15 allows for periodic or continuous removal of a portion of the saltwater medium from the rearing tanks for transference to the specific components of the system. For example, the saltwater medium may be moved through the drum filter 18 and directly into the moving bed bioreactor 14 and/or anaerobic denitrification unit 16. In the alternative, the saltwater medium is diverted through the sludge holding tank 20 to provide sulfates to the sulfate reducing microorganisms colonized therein.

In operation, the aquaculture system of FIG. 1 recirculates the saltwater medium through the respective components. As an arbitrary starting point, saltwater medium, solids and contaminants are removed from the lower portion of fish tanks 12, either by gravity flow or pumping, and directed to a microscreen drum filter 18 wherein the solids are filtered out and clean water is discharged therethrough. Any filtering means may be used that provides for filtering of the saltwater medium and wherein any solids are trapped on a filter screen and cleaned saltwater can pass therethrough. Preferably, any solids that collect on the filter screen are removed therefrom with a backwash rinse system that uses the saltwater medium from the fish tanks and that backs the solids off the screen and into a sludge holding tank 20. Advantageously, by using the slat water medium from the fish tanks, the sludge tank is rich with sulfates with no water loss or unwanted dilution of the system with fresh water. An acceptable microscreen drum filter may include models sold by Hydrotech Microscreens. Preferably, the microscreen drum filter includes backwash jets that are directed against the outside of the microscreen filter and provide sufficient pressure to flush off solids. Further, if the filter screen becomes clogged with algal and/or slime growths, oil, and/or grease, it is beneficial to include additional cleaning systems such as ultraviolet lamps, ozone and hot water. The size of the screen filter media will influence filter performance, and as such, it should be recognized that smaller media will achieve more effective removal of suspended solids, but will involve increased pressure drop and head loss buildup. Therefore, a balance between removal efficiency and hydraulic loading rate must be considered.

As the water flows into the drum section, the filter screen separates particles from the liquid and if or when the screen filter is loaded or clogged, the backwash cycle is preferably started and any solids and the backwash liquid are moved through the interconnecting conduit 17 into the sludge holding tank 20.

The sludge holding tank 20 can be any size or shape and fabricated from any material structurally competent to hold the sludge material and maintain a media substrate for colonization of microorganisms, including reinforced plastic, steel, concrete or another suitable material any of which may be lined with a material which is inert with respect to the waste and salt water medium from the tanks 12. With regard to sizing of the system, the desired dwell time for optimum chemical reactions and the flow rates should be considered.

A suitable sulfate reducing bacteria and an appropriate nutrient to stimulate growth of the bacteria are disposed within the sludge holding tank. The term "sulfate" means any of the anions of alkali metals or alkaline earths bearing sulfur in an oxidized form, including but not limited to, sulfate ($SO_4^=$), sulfite ($SO_3^=$), thiosulfate, thiosulfite ($S_2O_3^=$), bisulfate ($HSO_4^-$) or bisulfite ($HSO_3$). Among the preferred sulfate reducing bacteria are those falling within the genera *Desulfobacter*, *Desulfobacterium*, *Desulfovibrio* and *Desulfotomaculum*. Among the specifically preferred *Desulfovibrio* species are *desulfuricans*, *vulgarus*, *salexigens*, *africanus* and *gigas*. The bacteria employed may either be a pure strain of one type or a mixture of two or more types.

It is preferred that the sulfate reduction process be conducted at a temperature of about 15° C. to 40° C., and more preferably about 30° C. to 37° C. The internal pressure of the holding tank may be atmospheric. It is preferred that the pH of the material in the holding tank be maintained in a range from about 6.0 to 8.0, and more preferably from about 6.8 to 7.5. Importantly, the pH is maintained above 7, thereby allowing for increased solubility of any generated hydrogen sulfide in the saltwater medium, for the subsequent movement to the denitrification unit.

The present invention contemplates providing a suitable source of nutrient media for bacterial growth within holding tank. Notably, the main source of nutrients for the sulfate reducing bacteria in the sludge tank is the organic solids collected from the fish tanks by the drum screen. These organic solids (mainly fish fecal and uneaten food) are partially degraded/fermented in the sludge tank and the products of that process are the main nutrient source for the sulfate reducing bacteria. The nutrient media is preferably present at its solubility limit in order to maximize efficiency. In some situations, addition nutrients may be added and as such lactic acid may be provided in the form of dairy byproducts or wastes, such as sour milk, or whey stream is a preferred carbon source. Other compounds, such as starch, pyruvate, butyrate, acetate and four-carbon fatty acids are also suitable. Additional sources of acceptable nutrient media include residues from the fish tank including food supplements for the aquatic species. Further, combinations of these media may be employed. The acetates can be or is produced from the breakdown of fatty acids and sugars. The use of acetate plus sulfate ($SO_4^{2-}$) provided as a major divalent ion of seawater are used to reduce sulfates as shown below illustrating a dissimilatory sulfate reduction process:

$$CH_3COO^- + SO_4^{2-} + 3H^+ \rightarrow 2CO_2 + H_2S + 2H_2O$$

The fraction of solution to be treated biologically in the holding tank will normally be controlled by the concentration of sulfate in the saltwater medium and the amount of hydrogen sulfide required for subsequent denitrification. In some cases, more hydrogen sulfide will be produced then required thereby causing a decrease in the system's pH. Advantageously, alkaline by-products generated by the sulfate reducing bacteria can be used to adjust the pH of the solution and to maintain the solubility of the generated hydrogen sulfide.

Typically, the requirement for $H_2$ for sulfate reduction will be a parameter that should be considered because theoretically, 4 moles of $H_2$ are required for each mole of $SO_4$ reduced. In practice, more than the theoretical amount of $H_2$ will likely be required, due to inefficiencies in $H_2$ uptake and utilization in the holding tank. As such, the sludge holding tank of the present system may be equipped with an inlet for introducing such a gas in an amount sufficient to stoichiometically react with the divalent sulfate in the saltwater medium, if necessary.

As the bacteria employed are anaerobic, it is important that the oxygen content be reduced in the mixed liquor of sludge and backwash liquid in the sludge holding tank. Advantageously, no special containment to resist entry of oxygen is required because activity of heterotrophic bacteria (*Pseudomonas, Bacillus*) within the sludge tank on the organic solids is responsible for maintaining a low oxygen level, (down to greater than −800 mv) which promotes sulfide production by the sulfate reducing consortia. This is evident by the fact that when the system is cleaned to remove material build-up it is necessary to recharge it with a carbon source, such as starch, to stimulate the oxygen consumption, which enhances sulfide production.

The bacteria may be introduced into the system by any convenient means either upstream of the holding tank or directly into the tank. Nutrients for the bacteria may be blended in a ratio that is dependent upon the sulfate content of the saltwater medium or artificially generated saline solution of the mixed liquor removed from the drum filter 18.

A portion of the sulfate in the mixed liquor is reduced to hydrogen sulfide, which is withdrawn from the holding tank and moved to the denitrification unit 16. Any accumulation of solid products suspended in the liquid in the sludge holding tank is removed through sludge drain 21.

The interior of the sludge holding tank 20 is provided with a means to support the bacteria. In the embodiment shown, a polymeric bead, preferably polyethylene beads having a volume of about $0.1 \, m^3$ to about $0.9 \, m^3$, serve as support for the anaerobic sulfate reducing bacteria. Among the preferred materials for this purpose is a material selected from the group consisting of crushed glass, glass beads, plastic particles, ceramic particles, plastic or glass tubes, pumice, sand and gravel. Sulfate reducing bacteria adhere to this supporting material, multiply and eventually form a film covering the support material.

In the illustrated embodiment, the sulfate containing mixed liquor will, under the influence of a pump, will be transferred from the drum filter to the holding tank and for passing over or through the support material thereby causing the mixed liquor to contact the anaerobic bacteria. As sulfate-laden liquor passes over this bacterially populated support material, the sulfate in the saltwater medium can be metabolized by the bacteria to produce at least sulfide. Generally, sludge retention is between 3 to 10 days.

Referring to FIG. 1, it is seen that saltwater medium comprising generated sulfides and having low oxygen content is withdrawn from the sludge holding tank through conduit 22 to the denitrification unit 16. (The sulfate concentration of the saltwater medium leaving the holding tank will be lower relative to the concentration as the saltwater medium enters the holding tank)

As stated above, nitrate may reach high levels in a recirculating system, and as such denitrification is required. In the present system, denitrification is carried out by anaerobic autotrophic denitrifier bacteria that, in reduced oxygen, preferably below 0.5 mg/L, and in the presence of sulfides, are capable of using nitrates or nitrites as electron acceptors.

To facilitate denitrification, the present invention provides a denitrification chamber in which the amount of oxygen is severely limited. The fixed bed denitrification unit 16 utilizes a packed column, with denitrifying microbial populations attached on the support media. The column can be either a downflow or upflow configuration, recognizing that in the present illustration of FIG. 1, an upflow column is used. Upflow columns have much longer contact times and operate at lower hydraulic loadings and are more efficient at lower temperatures than downflow columns. Temperature again is a very significant factor affecting denitrification efficiency, and as such, the system or individual components can be connected to a heating source.

The fixed upflow denitrification unit 16 comprises support media for the growth of microorganisms, including bacteria exhibiting sulfide-oxidizing and nitrate reducing activity. This support media, also known as biomass carrier structures can be constructed from a variety of materials into a variety of shapes and sizes. For example, natural or artificial materials can be used, such sponges, synthetic foams, both open-celled and close-celled foams, and extruded plastics, both specially designed extruded plastic and recycled waste plastic including polyethylene beads. Another embodiment contemplates biomass carrier structures comprised of polyurethane foam cut into cubes, spheres, or other regular and non-regular shapes, that provide a large amount of surface area for the support and growth of microorganisms.

The biomass carrier structures used in the practice of the present invention can be provided in a number of ways. One way is to obtain the biomass carrier structures from a denitrification unit, which has been in operation. Another way is to prepare the biomass carrier by attaching the microbes to the carrier. The means by which the microbes are attached to the biomass carrier is not critical to the practice of the present invention. Typically, microbes form films on surfaces of almost any material with which they are in contact during replication without regard to the material's surface morphology (i.e. without regard to whether the surface is smooth, creased, or roughened). Consequently, the easiest way in which to attach microbes to the carrier is to expose the carrier to microbes under conditions effective for the microbes to attach to the carrier surface and effective for the microbes to replicate.

It is typically advantageous to seed the biomass carrier structure with higher concentrations of microbes during start-up or at times when inhibitory conditions exist. After seeding the carrier structures, conditions are maintained which are effective for microbial population growth. As the microbe population increases, the microbes naturally form films on the surface of the carrier structures that reach an equilibrium thickness in several weeks. The thickness of the microbial film at equilibrium depends primarily on the type of microbe. Typically, films suitable for the practice of the present invention have a thickness of from about 50 μm to about 500 μm.

Any anaerobic microbe capable of using nitrate as the terminal electron acceptor, while oxidizing the elemental sulfur to sulfates may be used in the denitrification unit. Selection of a particular microbe for a particular application is based upon a number of factors which will be apparent to those skilled in the art, such as the necessary conversion efficiency, the availability of microbes capable of effecting the conversion, the conditions under which the reaction is to be conducted (temperature, reduced oxygen level, presence or absence of other materials contaminating the reactant or byproducts of the reaction which are toxic to the microbes), the biomass carrier employed, and the ease of attaching the microbes to the biomass carrier. Among the preferred anaerobic sulfide oxidizing bacteria are those falling within the genera *Thiobacillus, Thiomicrospira* and *Campylobacter* sp. Among the specifically preferred *Thiobacillus* species are *denitrificans, versutus, delicatus, aquaesulis* and *thyasiris*; and the preferred *Thiomicrospira* are *pantotropha* and *denitrificans*. The bacteria employed may either be a pure strain of one type or a mixture of two or more types. More preferably, the anaerobic denitrifying bacteria, includes *Thiobacillus denitrificans* or *Thiomicrospira denitiifcans*.

The denitrification process may be conducted at a temperature of about 25° C. to 40° C., and more preferably from about 25° C. to 30° C. The internal pressure of the holding tank may be atmospheric. It is preferred that the pH of the material in the denitrification unit be maintained in a pH range from about 5.0 to 9.0, with about 6.8 to 7.5 being preferred. Again, as stated earlier, the pH should be maintained in a range, to insure that any hydrogen sulfide produces stays in solution to make it available for sulfide oxidation by the anaerobic denitrifyng bacteria.

The sulfide oxidation and nitrate reduction is exemplified by the following reaction wherein the sulfide generated in the dissimilatory sulfate reduction process is coupled to denitrification.

$$5H_2S + 8NO_3^- \rightarrow 5SO_4^{2-} + 4N_2 + 4H_2O + 2H^+$$

In the treatment of saltwater the denitrification unit is preferably, positioned before the nitrification unit to provide a source on ammonia because some anaerobic sulfide oxidizing bacteria lack the ability to synthesize assimilatory nitrate reductases, therefore a source of ammonia/nitrogen must be present for cell/protein synthesis to take place.

After a sufficient retaining period in the denitrification unit to ensure that the reaction described above has reduced the levels of nitrates, the saltwater medium is transferred to the nitrifying moving bed bioreactor (MBB) 14. The MBB comprises suspended media for the support and growth of microorganisms, including nitrifying bacteria. This support media can include the support media as discussed above.

Preferably, the moving bed reactor comprises biomass carrier structures fabricated from polyethylene with a density slightly lower than water. The biomass carrier structures are suspended in the effluent and maintained therein by air diffusers and/or propeller mixers within the biofilter reactor. The biomass carrier structures are retained by means of suitably sized sieves or plates. With a density slightly less than water, this support media provides a large protected surface for bacteria. The moving bed process creates optimum biological conditions as the air circulates and oxygen is dispersed therein.

Any microbe capable of metabolizing the ammonia into less toxic nitrogenous compounds such as nitrate may be used in the MBB 14. By way of illustration, microbes suitable for the treatment of aquaculture effluent include aerobic nitrifying bacteria, such as *Nitrospira* sp, *Nitrosococcus* sp, *Nitrosoinonas* and *Nitrobacter.*

The biomass carrier structures and seeding procedures discussed above may be used in the nitrification unit.

The nitrifying bacteria remove substantial amounts of solubilized ammonia by metabolizing the ammonia to form nitrates. The basic process of ammonia contaminant breakdown consists of nitrification. Nitrification breaks down ammonia in solution to nitrate as follows:

$$NH_4^+ \rightarrow NO_2^- \rightarrow NO_3^-$$

The oxidation of ammonia to nitrate is a two-step sequential biological process involving two different autotrophic bacteria, most commonly of the genus *Nitrospira sp. Nitrosococcus sp. Nitrosomonas sp.* and *Nitrobacter sp.* that utilize the ammonia as an energy source. For this process, nitrate ($NO_3^-$) is produced by the oxygen-dependent nitrification reaction that occurs within the aerobic compartment of the biofilter and is a result of oxidation of ammonia ($NH_4+$), the metabolic waste product of fish, to nitrate via a nitrite ($NO_2^-$) intermediate, as follows:

$$NH_4^+ + 1.5O_2 \rightarrow NO_2^- + 2H^+ + H_2O$$

$$NO_2^- + 0.5O_2 \rightarrow NO_3^-$$

Preferably, the biomass carrier structures in the aerobic MBB are kept in continuous motion at an effluent flow velocity of about 0.15 to about 2.00 cubic feet per second. Continuous movement is maintained by air diffusers in the MBB and/or by means of propellers mixer in the reactor. The MBB is preferably equipped with a diffused air system, which supplies air/oxygen to the system. In the aerobic MBB the concentration of dissolved oxygen has to be relatively high because the dissolved oxygen is the limiting factor in the nitrification process. Typically, the preferred aerobic MBB operates at a dissolved oxygen concentration of about 4 to about 8 mg/l. WO 91/11396 (Rusten) provides additional technical information for optimal performance of the preferred aerobic biofilter reactor of the present invention, the contents of which are hereby incorporated by reference herein for all purposes.

Optimization of flow rates through the nitrification unit depends primarily on the characteristic reaction rate of the microbe with the ammonia, the concentration of the ammonia or other nitrogenous components, the operating interfacial surface area of the biomass carrier structures, particulate material, and the density of the material of the biomass carrier structures relative to the fluid in which it is dispersed. The flow can have both a vertical and a horizontal component. The vertical component can be either upward or downward. In cases where the material of the biomass carrier structures has a specific gravity greater than that of the aqueous effluent, an upward vertical flow effective to form an expanded bed is preferred. Alternatively, a downward vertical flow effective to form an expanded bed is advantageous where the material has a specific gravity less than the specific gravity of the aqueous effluent.

In addition to the removal of ammonia from the aquaculture effluent, the aerobic MBB unit removes significant amounts of carbon dioxide from the aquaculture effluent. The carbon dioxide is a naturally occurring metabolic product of fish respiration and may rise to toxic levels if left in solution and not removed. The carbon dioxide also decreases pH levels of the water that can reach unacceptable parameters in aquaculture systems.

The system of the present invention may include an automatic monitor and control system communicatively connected to the recirculating aquaculture system 10 and includes a water quality monitor and control system, and an automatic feed dispensing control system. A microprocessor may be employed with a plurality of sampling pumps and/or in line monitoring devices located in the different components including the rearing tanks 12, sludge holding tank 20, denitrification unit 16 and MBB 14 to measure water temperature, oxygen content, pH, ammonia, nitrite, nitrate, sulfate, sulfide, COD and/or oxygen. The reading of the measured data may be shown on a display device of the microprocessor and may be used to control operations of the recirculating aquaculture system. An automatic feed dispensing control system may be included that allows for dispensing and distributing feed and nutrients into the rearing tanks 12 in a constant time and quantity fashion.

While the preferred process of the invention involves a continuous, as distinguished from batch process, the materials will be retained in the different components for a period of time that will maximize process efficiency. Dependent on the sampling results, one skilled in the art can determine the optimal retention time of the recirculating salt water medium in the individual units and thus the overall time required for reducing nitrates to an acceptable level. Generally, a recirculating cycle can range from 4 to 48 hours, and more preferably from about 8 to about 12 hours, with a longer retention time in the sludge tank, as discussed above. Further, it should be recognized that the flow rate of the recirculating saltwater medium through the different components may individually be adjusted dependent on the density and metabolic conversion rate of the respective microorganisms. Preferably, the flow rate ranges from about 0.1 $m^3$/hr to about 10 $m^3$/hr through the different components.

It is understood that modification that do not substantially affect the activity of the various embodiments of this invention are also included within the definition of the invention provided herein. Accordingly, the following examples are intended to illustrate but not limit the present invention.

EXAMPLES

Materials and Methods

System Configuration.

Two 4.2 $m^3$ tanks were operated with gilthead seabream, *Sparus aurata*, fingerlings at a density of 5-10 kg/$m^3$ and a feeding rate of 2%-2.5% body weight/day. The tanks were connected to a 2 $m^3$ nitrifying moving bed bioreactor (MBB) and a flow rate of 8 $m^3$/hr was set to enable two exchanges of tank water per hour through the filter. Attached to this tank as a side loop was a 0.3 $m^3$ cylindrical up-flow fixed bed biofilter filled with 0.2 $m^3$ of polyethylene beads for denitrification. This anaerobic biofilter component was set with a low flow rate of 0.1 $m^3$/hr. Sludge collection was carried out through a drum screen filter with backwash system that used tank water. Sludge and backwash water were collected in a 0.3 $m^3$ rectangular tank with 0.1 $m^3$ beads that provided a means for solids removal as well as substrate for bacterial colonization. Water from the sludge tank was pumped back into the system via the anaerobic biofilter and high-density sludge was collected and removed weekly. The system configuration is as shown in FIG. 1.

Chemical and Physical Analyses.

Ammonia, nitrite and nitrate were determined as described before by Tal et al. (2003) and sulfide was determined as described by Strickland and Parsons (1968). Oxygen and temperature were measured with an YSI (model 57) temperature/oxygen probe (Yellow Springs Instruments, USA). Salinity was monitored with a refractometer (model: S-10E, Atago, Japan).

Results and Discussion

Figure 2:
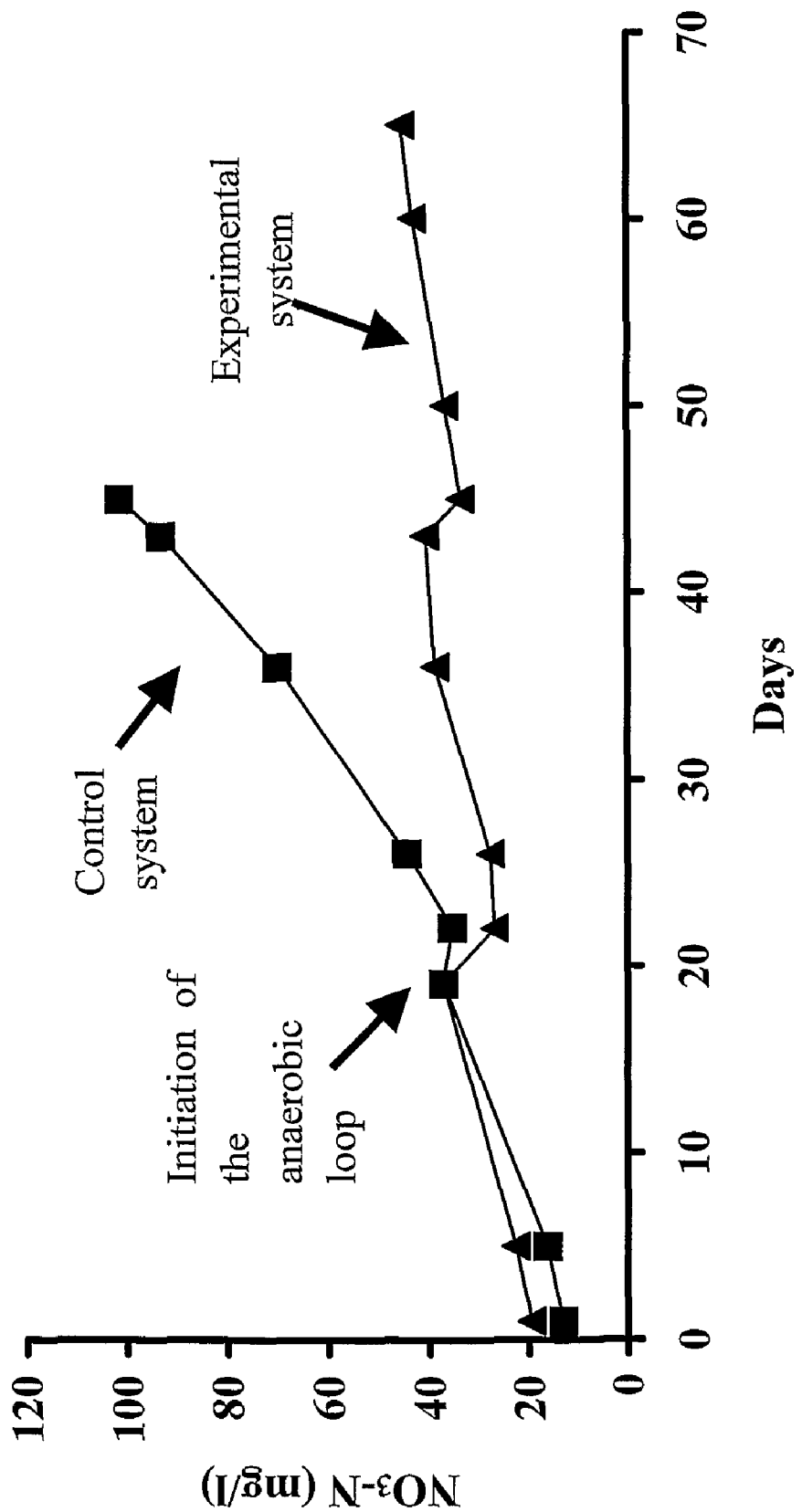
FIG. 2 shows nitrate concentrations determined in a recirculating aquaculture system of the present invention and a control recirculating systems and comparison thereof.

The data presented herein reflect the first 65 days in an on-going experiment. Initially, 2000 seabream fingerlings were introduced, at an average weight of 0.5 g and at day 65 average fish weight was 20 g. During this period, fish consumed 40 kg of food and reached densities of 10 kg/$m^3$. The daily saltwater exchange was lower than 0.5% of the total system volume, with fresh water addition necessary solely to recover water loss by evaporation. FIG. 2 shows the total ammonia and nitrite concentration during the 65 days for the system of the present invention, as well as a similar system that did not include the up-flow fixed-bed denitrification reactor (i.e., a control system). As shown in FIG. 2, nitrate levels for the control tank peaked at day 42 and reached a concentration of 102 mg/l $NO_3$—N. In the system of the present invention, using the dissimilatory sulfate reduction process, nitrate accumulation was maintained at concentrations of 35-45 mg/l $NO_3$—N. Thus, the fixed-bed denitrification unit was effective in keeping stable and low nitrate levels.

Figure 3:
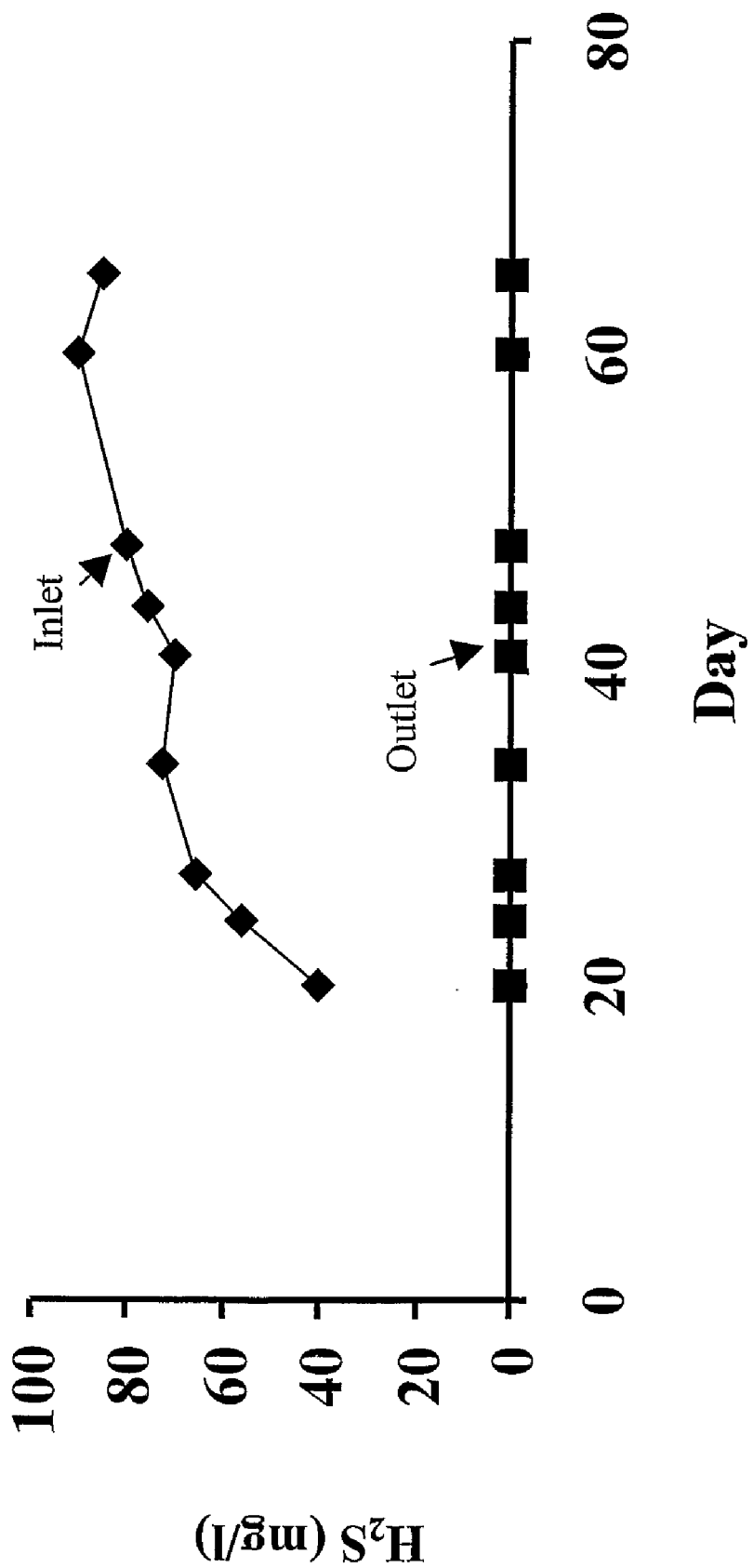
FIG. 3 shows sulfide concentrations at the inlet and outlet of the denitrifying unit of the present invention.

Since the configuration of the support media within the fixed-bed denitrification reactor was designed to promote anoxic conditions, it was suspected that any sulfide that was generated as a consequence of sulfate reduction within the sludge tank was to be used by the autotrophic denitrifying bacteria to power denitrification. To determine that this was occurring, the sulfide concentration in water samples was measured from both denitrification bioreactor inlet and outlet sites. As presented in FIG. 3, sulfide levels from the inlet sample were detected as high as 90 mg/L, while no significant sulfide could be measured in water leaving the reactor.

Using the stoichiometric equation for biological sulfide oxidation with nitrate,

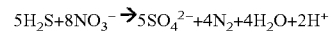

it was calculated that complete oxidation of sulfide to sulfate with complete reduction of nitrate to nitrogen gas will occur when the sulfide/nitrate mole ratio approaches 0.62. A calculation of the mole ratio of daily nitrate and sulfide removal by the denitrifying bioreactor for several days over the course of the experiment is shown in Table 1. Except for one day (day #60), the actual sulfide/nitrate ratio was 20-50% lower than the theoretical ratio derived from the stoichiometric equation shown above. The lower ratios suggested that while some of the nitrate was removed through the autotrophic sulfate/nitrate coupled process, it is likely that the remainder was removed through nitrate reduction by heterotrophic denitrifying bacteria that utilized organic carbon as electron donor.

Several types of bacteria were identified in the different component units of the system on the basis of homology to 16S rRNA sequence. For example, a sulfate reducer in the sludge tank was identified as *Desulfuromonas sp.* Also found in the system was a sulfite oxidizer, *Sulfobacter* and as sulfide oxidizing/nitrate reducing candidate *Thiploca sp.*

TABLE 1

Daily nitrate and sulfide removal by the denitrifying bioreactor (see text for details).

| # Day | Daily $H_2S$ production (mole) | Daily $NO_3^-$ removal (mole) | $H_2S/NO_3^-$ mole ratio |
|---|---|---|---|
| 22 | 0.82 | 2.59 | 0.31 |
| 26 | 0.96 | 3.54 | 0.27 |
| 36 | 1.07 | 2.5 | 0.42 |
| 43 | 1.03 | 3.88 | 0.26 |

TABLE 1-continued

Daily nitrate and sulfide removal by the denitrifying bioreactor (see text for details).

| # Day | Daily $H_2S$ production (mole) | Daily $NO_3^-$ removal (mole) | $H_2S/NO_3^-$ mole ratio |
|---|---|---|---|
| 45 | 1.11 | 2.75 | 0.4 |
| 50 | 1.17 | 3.45 | 0.34 |
| 60 | 1.33 | 2.17 | 0.61 |
| 65 | 1.25 | 2.52 | 0.49 |

CONCLUSIONS

The present results indicated that the sludge/denitrifying filter sequence was very effective in stimulating nitrate removal. The denitrifying compartment removed as much as 40-70% of the nitrate load introduced from the system, which allowed for overall system nitrate concentrations to be maintained between 35-65 mg ($NO_3$—N)/l during operation and enabled daily water exchange to be less than 1% of total system volume. Stimulation of nitrate reducing activity was due, in part, to the presence of dissimilatory sulfate reduction activity that occurred during sludge waste decomposition; sulfide levels within the sludge compartment were as high as 60-80 mg/l. On the other hand, effluent water from the denitrifying compartment showed no measurable sulfide. Thus, it is shown that denitrification can be driven by the redox gradient between system compartments thereby resulting in sulfate reduction (sulfide production), which, in turn, nitrate reduction. This process has wide application for marine recirculating systems, where sulfate concentration is not a limiting factor and minimizing water exchange is critical.

The present results demonstrate that nitrate levels can be controlled in marine recirculating system by the addition of a low volume anaerobic loop (6% of the total system volume) in order to promote autotrophic denitrification carried out by sulfide-oxidizing bacteria. Another advantage of using autotrophic denitrification instead of heterotrophic denitrification is the low organic biomass produced by autotrophic denitrifiers. This is important in order to minimize clogging problems associated with high bacterial biomass especially in an up-flow fixed-bed reactor similar to the one used in this study.

Whereas particular embodiments of the invention have been described above for purposes of illustration, it will be appreciated by those skilled in the art that numerous variations of the details may be made without departing from the invention as described in the appended claims.

REFERENCES

The contents of all reference are incorporated by reference herein for all purposes.

Kaiser, H., Moskwa, G. and Schmitz, O. "Growth of trout in a recirculated system with pH-stabilization by denitrification." *J. World Aquacult. Sot.,* 20 (1989): 46.

Kristensen, E., Holmer, M. "Decomposition of plant materials in marine sediment exposed to different electron acceptors ($O_2$, $NO_3^-$, and $SO_4^{-2}$), with emphasis on substrate origin, degradation kinetics, and the role of bioturbation." *Geochimica et Cosmochimica Acta,* 65 (2001) 419-433.

Lee, P. G., Lea, R. N., Dohmann, E., Prebilsky, W., Turk, P. E., Ying, H., Whitson, J. L. "Denitrification in aquaculture systems: an example of a fuzzy logic control problem." *Aquacultural Engineering* 23 (2000) 37-59.

Malone, R., DeLosReyes, A. A. Jr. "Categories of recirculating aquaculture systems." In: Advances in aquacultural engineering. Northeast regional agricultural engineering service, NRAES-105, Cornell (1997) 197-208.

Otte, G. and Rosenthal, H. "Management of closed brackish-water system for high density fish culture by biological and chemical water treatment." *Aquaculture* 18 (1979): 169-18 1.

Payne, W. J. "Energy yields and growth of heterotrophs." *Annu. Rev. Microbiol.* 24 (1970) 17-52.

van Rijn, J. "The potential for integrated biological treatment systems in recirculating fish culture." *Aquaculture* 139 (1996):181-201.

Strickland, J. D. and Parsons, T. R. "A practical handbook of seawater analysis." Bulletin Fisheries Research Board of Canada, Ottawa, (1968) pp. 77-80.

Tal, Y., Watts, J. E., Schreier, S. B., Sowers, K. R., Schreier, H. J. "Characterization of the microbial community and nitrogen transformation processes associated with moving bed bioreactors in closed recirculated mariculture systems." *Aquaculture* 215 (2003): 187-202.

Zohar, Y., Tal, Y., Schreier, H., Steven, C., Stubblefield, J. and A. Place, A. "Commercially Feasible Urban Recirculated Aquaculture: Addressing the Marine Sector." In, *Urban Aquaculture,* B. Costa-Pierce, ed. (2003) CABI Publishing.

That which is claimed is:

1. A method for reducing and/or removing nitrogenous products from a marine recirculating aquaculture system, the method comprising:

housing an aquatic species in a rearing tank containing salt water medium, wherein the salt water medium comprises sulfates and is contaminated with at least ammonia and nitrates;

transferring the salt water medium from the rearing tank through a downstream filter for separating solid materials from the salt water medium;

transferring separated solids and at least some of the salt water medium to a sludge holding tank, wherein the sludge holding tank comprises a media substrate for growth of anaerobic microorganisms active in sulfate reduction;

retaining the separated sludge and salt water medium in the sludge holding tank a sufficient time for generating sulfides through metabolic reduction of sulfate in the salt water medium by the anaerobic microorganisms active in sulfate reduction;

transferring the salt water medium comprising the sulfides from the sludge holding tank to a denitrification unit positioned downstream from the sludge tank, wherein the denitrification unit comprises a fixed bed of media substrate for growth of anaerobic microorganisms active in sulfide oxidization and nitrate reduction;

retaining the salt water medium in the denitrification unit for a sufficient time for oxidizing sulfides to sulfates and reducing nitrates to nitrogen gas by the microorganisms active in sulfide oxidization and nitrate reduction;

transferring the salt water medium from the denitrification unit to a nitrifying moving bed bioreactor (MBB) positioned downstream from the denitrification unit, wherein the MBB comprises moving suspended media substrate for growth of aerobic microorganisms active in nitrification;

retaining the salt water medium in the MBB for a sufficient time to reduce ammonia concentration in the salt water medium; and transferring the salt water medium from the MBB to the rearing tank for recirculation.

2. The method according to claim 1, wherein the microorganisms active in sulfate reduction comprises bacteria from the genera *Desulfobacter, Desulfobacterium, Desulfovibrio* or *Desulfotomaculum*.

3. The method according to claim 1, wherein the microorganisms active in sulfide oxidation/nitrate reduction comprises a bacteria from the genera *Thiobacillus* or *Thiomicrospira*.

4. The method according to claim 1, wherein the media substrate in the sludge holding tank is fabricated from polyethylene.

5. The method according to claim 1, wherein the flow rate through the components including the rearing tank, denitrification unit, filter or MBB from about 0.1 $m^3$/hr to about 10 $m^3$/hr.

6. The method according to claim 5, wherein the flow rate is the same for all components or different for each component.

7. The method according to claim 1, wherein the pH in the sludge holding tank and denitrification unit is maintained in a range from about 6.8 to about 9.

8. The method according to claim 7 wherein the pH in the sludge holding tank and denitrification unit is maintained at above 7.

9. A marine recirculating aquaculture system, the system comprising:
   at least one aquatic species rearing tank, wherein the rearing tank comprises a salt water medium;
   a sludge holding tank positioned downstream from the rearing tank and in fluid communication therewith, wherein the sludge holding tank comprises a media substrate wherein one or more microorganisms active in sulfate reduction are growing on the media substrate;
   a denitrification unit positioned downstream from the sludge tank and rearing tank and in fluid communication therewith, wherein the denitrification unit comprises a media substrate wherein one or more anaerobic microorganisms active in both sulfide oxidization and nitrate reduction are growing on the media substrate; and
   a nitrifying moving bed bioreactor positioned downstream from the denitrification unit and upstream of the rearing tank and in fluid communication therewith, wherein the nitrifying moving bed bioreactor comprises a media substrate wherein one or more microorganisms active in nitrification are growing on the media substrate.

10. The system according to claim 9, further comprising a drum screen filter positioned between the rearing tank and the sludge tank and in fluid communication therewith, wherein the drum screen filter separates solids transferred from the tank in the recirculating salt water medium with subsequent transference of such separated solids to the sludge tank.

11. The system according to claim 10, further comprising a conduit system for connecting the rearing tank, drum screen filter, sludge holding tank, denitrification unit and moving bed bioreactor.

12. The system according to claim 9, wherein the nitrifying moving bed bioreactor comprises an inlet and outlet for movement of the salt water medium therethrough;

a suspended media substrate wherein the suspended media is kept in motion by the movement of the salt water medium and wherein the substrate has one or more aerobic microorganisms active in nitrification growing thereon; and an aerator to inject air or oxygen into the salt water medium for effective aerobic nitrification by the microorganisms.

13. The system according to claim 9, wherein the media substrate comprises polyethylene beads.

14. The system according to claim 9, further comprising an automatic monitor and control system communicatively connected to the different system components.

15. The system according to claim 9, wherein the denitrification unit is an upflow fixed substrate column.

16. The system according to claim 9, wherein the moving bed bioreactor is an upflow column.

17. The system according to claim 9, further comprising a plurality of sampling pumps and/or in line monitoring devices located in at least the rearing tank, drum screen filter, sludge holding tank, denitrification unit and moving bed bioreactor to measure water temperature, oxygen content, pH, ammonia, nitrite, nitrate, sulfate, and/or sulfide levels.

18. A method for reducing and/or removing nitrogenous species from a marine recirculating aquaculture system, the method comprising:
   rearing an aquatic species in a rearing zone containing salt water medium comprising sulfates, ammonia and nitrates;
   filtering the salt water medium from the rearing zone to separate solids from the salt water medium and yield a filtered salt water medium;
   reducing sulfate in the filtered salt water medium to sulfide by action of anaerobic microorganisms adapted for sulfate reduction, to yield sulfide-containing salt water medium;
   oxidizing sulfides in the sulfide-containing salt water medium to sulfates and reducing nitrates in the sulfide-containing salt water medium to nitrogen gas, by action of anaerobic microorganisms adapted to both oxidize sulfides and reduce nitrates, to yield a denitrified saltwater medium;
   reducing ammonia in the denitrified salt water medium, by action of aerobic microorganisms adapted therefore, to yield an ammonia-reduced salt water medium; and
   recycling the ammonia-reduced salt water medium to the rearing zone.

19. The method of claim 18, wherein the step of reducing ammonia is carried out in a moving bed bioreactor (MBB).

20. The method of claim 18, wherein said anaerobic microorganisms adapted for sulfate reduction comprise bacteria of at least one of the genera selected from the group consisting of *Desulfobacter, Desulfobacterium, Desulfovibrio* and *Desulfotomaculum*, and said anaerobic microorganisms adapted for oxidizing sulfides in the sulfide-containing salt water medium to sulfates and reducing nitrates in the sulfide-containing salt water medium to nitrogen gas, comprise bacteria of at least one of the genera selected from the group consisting of *Thiobacillus* and *Thiomicrospira*.

* * * * *

UNITED STATES PATENT AND TRADEMARK OFFICE
CERTIFICATE OF CORRECTION

PATENT NO. : 7,462,284 B2  Page 1 of 1
APPLICATION NO. : 10/588256
DATED : December 9, 2008
INVENTOR(S) : Harold J. Schreler It is certified that error appears in the above-identified patent and that said Letters Patent is hereby corrected as shown below:

Column 9, line 15: "denitiifcans" should be -- denitrificans --.

Column 9, lines 24-25: "denitrifyng" should be -- denitrifying --.

Column 9, line 61: "Nitrosoinonas" should be -- Nitrosomonas --.

Signed and Sealed this

Twenty-fourth Day of February, 2009

JOHN DOLL
*Acting Director of the United States Patent and Trademark Office*